No. 726,651. PATENTED APR. 28, 1903.
B. CULLEN.
ELECTRIC WIRE SUPPORT.
APPLICATION FILED JULY 14, 1902.
NO MODEL.

WITNESSES:
W. L. Bushong.
Nellie Allemong.

INVENTOR
Beauregard Cullen
BY
V. H. Lockwood.
ATTORNEY

United States Patent Office.

BEAUREGARD CULLEN, OF NEW ALBANY, INDIANA.

ELECTRIC-WIRE SUPPORT.

SPECIFICATION forming part of Letters Patent No. 726,651, dated April 28, 1903.

Application filed July 14, 1902. Serial No. 115,426. (No model.)

*To all whom it may concern:*

Be it known that I, BEAUREGARD CULLEN, of New Albany, county of Floyd, and State of Indiana, have invented a certain new and useful Electric-Wire Support; and I do hereby declare that the following is a full, clear, and exact description thereof, reference being had to the accompanying drawings, in which like numerals refer to like parts.

The important purpose of this invention is the arrangement and mounting of the insulation in means for supporting telegraph and telephone wires, so the insulation will be protected from external violence calculated to break it.

An object of this invention is to provide an economical and effective means for supporting electrical wires, and especially for carrying and supporting telegraph and telephone wires on poles or elsewhere.

The nature of the invention will be understood from the accompanying drawings and the following description and claims.

Figure 1:
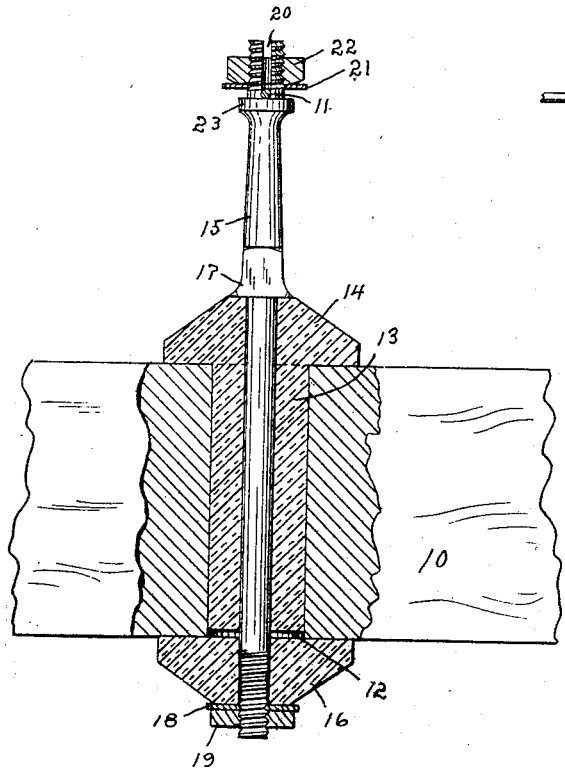
Figure 2:
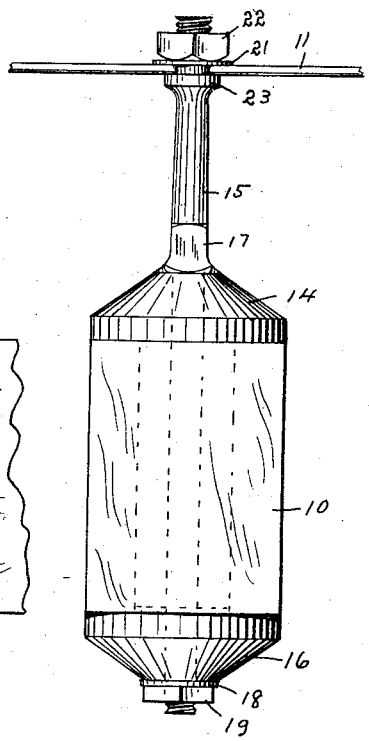

In the drawings, Figure 1 shows a side elevation of a portion of an arm at the upper end of a telegraph-pole or elsewhere with an insulator in place, parts being in section. Fig. 2 is an end elevation of said arm with the insulator in place, showing the latter in side elevation.

In detail, 10 represents a cross-arm at the top of a telegraph-pole or any other timber adapted to support the wire 11. A hole 12 is bored through the arm 10 to receive the sleeve 13, made of glass or other insulating material. Said sleeve has a cap 14 on one end that abuts against one side of the arm 10. A metal pin 15 extends centrally through said sleeve 13, and on its lower end receives the block 16, made of glass or other insulating material. Said pin has a shoulder 17 on one side to prevent its being drawn through the sleeve 13 and head 14. A washer 18 and nut 19 on the other end of the pin, which is threaded, draw and clamp the head 14 and the block 16 against the arm 10 and also secure the pin 15 in place therein. For that purpose the sleeve 13 is shorter than the hole 12.

The wire-holding end of the pin 15 is split to make the slot 20, in which the wire 11 is placed, and is clamped in by the washer 21 and nut 22. A shoulder 23 is provided on the pin 15, against which the wire 11 rests.

It is thus seen that the insulation is protected from external violence calculated to break it, as it is not exposed in such manner as to receive injury from the bullets and shot of hunters or stones thrown by boys, and the like.

What I claim as my invention, and desire to secure by Letters Patent, is—

1. An electric-wire support including an arm with a vertical hole through it, an insulating-sleeve fitting in said hole with one end enlarged to bear against said arm, a metal pin extending through said sleeve for carrying the wire and provided with a shoulder bearing against the enlarged end of the insulating-sleeve, and means on the other end of the pin acting against said arm to secure said sleeve and pin in place.

2. An electric-wire support including an arm with a vertical hole through it, an insulating-sleeve fitting in said hole, but not extending entirely through the same with one end enlarged to bear against said arm, a metal pin extending through said sleeve for carrying the wire and provided with a shoulder at one end and threaded at the other end, an insulating-block on the threaded end adapted to bear against said arm, and a nut on the threaded end of the pin for holding the pin and insulation in place in said arm.

In witness whereof I have hereunto affixed my signature in the presence of the witnesses herein named.

BEAUREGARD CULLEN.

Witnesses:
FRANK BELVIZ,
JOSEPH S. FOLEY.